Patented Feb. 11, 1941

2,231,407

UNITED STATES PATENT OFFICE 2,231,407

METHOD OF COATING

Wilbur W. Castor, Crafton, and Frank R. Stoner, Jr., Sewickley, Pa., assignors to Stoner-Mudge, Inc., a corporation of Pennsylvania No Drawing. Application November 4, 1938, Serial No. 238,812

5 Claims. (Cl. 91—70)

This invention relates to the coating of metal surfaces with thermoplastic resin. The essential body-forming material with which the invention has to do is, typically, the copolymer of vinyl chloride and vinyl acetate that is known to industry as Vinylite. It may be any substance within a wider field presently to be defined. This application is a continuation in part of an application filed by us September 18, 1936, and bearing Serial No. 101,502.

In the coating of metal with thermoplastic resin it is established practice to bring the resin into solution, to spread the solution as a film upon the surface, and then to drive off the solvent. Practical considerations dictate the baking of the film-coated article. In order to effect adequate adhesion it is requisite that the baking be done at a temperature ranging from 350° to 400° F. In the case of Vinylite, however (and this observation is applicable to any polymer or co-polymer that contains a vinyl halide as one of its monomeric constituents), it has been found that, when baked upon any of the commonly used metals, thermal decomposition usually sets in before a temperature of 350° is attained. Accordingly, when a coating of Vinylite upon any of these metals is desired, it has heretofore been found necessary, first to lay down upon the metal surface a priming coat of such a thermally stable substance as an oleo-resinous varnish, for example, and upon that priming coat to spread the Vinylite film. The Vinylite then, kept from immediate contact with the metal, will endure the requisite high temperature.

This invention consists in bringing into metastable solution with the Vinylite (or its equivalent) another substance, chosen because of more intense polarity than Vinylite (and, accordingly, of superior adhesiveness), which other substance, when the film has been applied to the metal and while a condition of liquidity continues, will, by virtue of the meta-stable character of the solution and the more intense polarity of such other substance, seek the metal interface. It will concentrate at the metal interface, with displacement of the Vinylite outward to the air interface. The consequence and effect are that an integral but stratified coating is formed upon the metal surface; that the Vinylite, removed from immediate contact with the metal, may without breakdown be brought to the higher and optimum baking temperature; and that the underlying layer of the substance of more intense polarity will afford adhesion in higher degree. Conversely, it is true that, because of superior adhesion to the metal surface, the baking temperature need not be so high as otherwise would be requisite. Of the solution of the invention it may be said that in service it provides its own priming coating.

We have specified the co-polymers of vinyl chloride and vinyl acetate (known as Vinylite) as the essential body-forming material of the invention. In this union the ratio of chloride to acetate may range from 60:40 to 95:5; indeed, it is possible to suppress the acetate completely and use polymerized vinyl chloride alone. A typical preparation, however, is the co-polymer of vinyl chloride and vinyl acetate, united in the ratio of 87:13. Other substances that may be employed are the co-polymers of vinyl chloride and the lower aliphatic esters of acrylic and methacrylic acids; the polymers of the lower aliphatic esters of acrylic acid itself, not associated with vinyl chloride; the copolymers of vinyl chloride and styrene or substituted styrene; and the polymers of styrene or substituted styrene alone. The general formula for all of the substances specified is $(CH_2=CHX)_n$ in which X may be either a halogen, the hydroxyl radical, a monocarboxylic acyloxyl radical ($CH_3COO—$, $C_2H_5COO—$, $C_3H_7COO—$, etc.), a methyl, ethyl, propyl, butyl, or higher homologous alkyl carboxylate radical ($—COOCH_3$, e. g.), or a phenyl radical, or a substituted phenyl radical ($C_6H_5—$, $C_6H_4Cl—$, $C_6H_4CH_3—$, etc.). While this exhausts the list of substances thus far found to be available and practical, we have found no reason to doubt, but every reason to believe, that any thermoplastic resin not itself completely non-polar (such as is the product arising from the complete hydrogenation of the polymers of isobutylene) will be susceptible to the practice of the invention.

Among the substances here specified are certain ones that at normal baking temperatures are thermally stable. Other considerations, however, may in particular cases enter in, to render the invention useful, when practised even upon them. For example, in certain standard practices, the inner surfaces of cans that are to serve as food containers are to be coated, and the melting-point of solder becomes a limitation upon the permissible temperature of baking. But the melting-point of solder is lower than the optimum baking temperature of the essential body-forming material. Our invention then is available to afford, by the choice of a modifying substance whose optimum baking temperature is low, a satisfactory product, though the actual baking temperature be less than the melting-point of solder.

The added substance of more intense polarity and superior adhesiveness is specially selected from a class known commercially as alkyd resins. These alkyd resins, as is well known, are the resinous products derived from the reaction between a polybasic acid, a polyhydric alcohol, and a vegetable oil or mixture of oils. Alternately, the fatty acids derived from the above vegetable oils or their synthetic equivalents may be used in place of the oils themselves; and, in general, we mean by the term alkyd resin any substance within this characterization.

This added substance must in preparation for our purposes be so carefully adjusted to the essential body-forming material (typically the co-polymer of vinyl chloride, 87%, and vinyl acetate, 13%) that, though the two substances may be brought into homogeneous meta-stable solution in a mixture of ketones and aromatic hydrocarbons, they will, as the solvents evaporate, lose homogeneity; they will separate, and will arrange themselves within the still liquid film according to polarity difference, as has been explained. Preparation of the alkyd resin may be carried out as follows:

1000 grams of linseed oil are placed in a suitable reaction vessel fitted with the usual reflux condenser and mechanical agitator, and are brought to a temperature that typically may be 430° F., and are held at this temperature for 2 hours. The reaction vessel is then allowed to cool to a temperature approximating 375° F., and 1000 grams of a mixture of phthalic anhydride and glycerine, in the proportion of 3 moles of phthalic anhydride to 2 moles of glycerine (the inverse ratio of the number of reactive or functional groups per molecule), are introduced. The reaction temperature is then raised to approximately 450° F. and the reaction mixture maintained at this typical temperature, with mechanical agitation, and under a constant stream of $CO_2$. Small samples are withdrawn from the reaction vessel at regular time intervals and a determination of the "acid number" (a measure of the free or unreacted carboxylic acid groups) is made, in the usual manner. As soon as these determinations show the acid number to have dropped to a value lying within the range 10–60, the temperature is rapidly reduced to approximately 325° F. At this point the resinous reaction product is quite viscous, but still at this elevated temperature can easily be poured. The hot reaction product is transferred with continued mechanical agitation into 1000 grams of hiflash naphtha. The resulting solution of partially polymerized alkyd resin has a solids content of approximately 66%. The actual value may be slightly less than the figure given, due to unavoidable loss of phthalic anhydride in the early stages of the reaction, and to the loss of water, which is one of the products of the resinifying reaction.

It will be perceived that herein is found an oil modified polybasic acid polyhydric alcohol reaction product, and it remains to say that, the proportions of the ingredients having been selected, the reaction time has been so controlled, and the conditions have been so adjusted, as to afford a resinous product that is compatible in solution with the essential body-forming material (Vinylite or its equivalent) when the solvent is a mixture of ketones and aromatic hydrocarbons, but a product that, as the solvent in the course of the industrial operation evaporates, will tend increasingly to separate from the body-forming material, to segregate, and to concentrate at the metal interface, this without loss of integrity of the coating as a whole.

The more polar the body-forming material, the more polar must be the alkyd resin, in order that the two may be compatible in solution. In order to insure the requisite greater polarity for the alkyd resin it is necessary to reduce the percentage of oil modifier, and to readjust the reaction conditions and time, to yield a correspondingly higher final acid number. We have found that, to produce an alkyd resin which has the requisite polarity to accompany any one of the several thermoplastic polymers named as suitable body-forming materials, the oil modification should lie between 30% and 70%, and the acid number of the reaction product when it is taken from the reaction vessel should lie between 10 and 60. In special cases it may lie slightly outside these limits, but we employ typically and advantageously materials that fall within the above limits. When the body-forming material is a co-polymer of vinyl chloride (87%) and vinyl acetate (13%), the acid number of the reaction product should be 35–40. When the body-forming material is typically a co-polymer of vinyl chloride (80%) and ethyl acrylate (20%) the acid number of the reaction product should also be 35–40. If the percentage of ethyl acrylate (or of other typical acrylate ester) is greater than 20%, the acid number of the reaction product should be correspondingly increased.

Specific substances within the term alkyd resin and here contemplated are the resins resulting from the condensation of glycerol, phthalic anhydride, and linseed oil; of glycerol, succinic anhydride and China-wood (tung) oil; and of mannitol, maleic anhydride and perilla oil. It will be understood that, in place of the oils, pure acid constituents of the oils (linoleic, etc.) will afford the same reaction. Similarly, the straight (unmodified) glycerol anhydride resins will serve under certain conditions where abnormally high polarity is necessary.

In the baking operation, that follows the spreading of the solution in the form of a film upon the metal surface to be coated, the incompletely polymerized alkyd resin stratifies, as has been said, to the metal interface, and, under the influence of the elevated temperature, and as the solvent evaporates, undergoes the final stage of polymerization, and becomes tightly adherent to the metal. It continues also in integral union with the overlying Vinylite. In this final stage the now completely polymerized alkyd resin becomes relatively impervious to attack by the usual solvents. Since it is protected by the overlying Vinylite from atmospheric degradation, it retains its high adhesiveness, together with the inertness that characterizes completely reacted heat-reactive resinous bodies.

Following are exemplary preparations:

*Example 1*

To 70 grams of a solution consisting of 53% xylol, 27% methyl n-amyl ketone, and 20% co-polymer of vinyl chloride (87%) and vinyl acetate (13%) (to be had on the market under the trade-name, Vinylite) are added, with agitation, at room temperature, 30 grams of a solution consisting of 53% xylol, 27% methyl n-amyl ketone, and 20% of a linseed oil modified glycerol phthalic anhydride alkyd resin responsive to the limitations specified above. The resulting solution, the non-volatile portion of which consists of 70% thermoplastic copolymer (Vinylite) and 30% alkyd resin, is thinned to spraying consistency (approximately four parts of resin solution to one part of xylol) and is applied to the surface to be coated—a surface of tin or of steel, for example. A sheet of tin-plate so coated may be baked for ten minutes at 375° F. Examination then will reveal the fact that within the coating film stratification has occurred; that most of the alkyd resin is concentrated beneath, and in immediate contact with the metal surface, and that a definite film of predominantly Vinylite overlies the alkyd resin film. In consequence of such stratification, the coating will be found to be of superior adherence and of superior protective effect. It has in full measure the adhesive property of a coating of alkyd resin alone, and the moisture-excluding and corrosion-resisting properties of a coating of Vinylite alone. Furthermore, under the circumstances described, the presence of the alkyd resin has protective effect relative to the Vinylite, and the baking temperature requisite for best adhesion may be attained in a single coating operation without any disadvantageous decomposition of the Vinylite.

*Example 2*

A solution is prepared containing 53% xylol, 27% mesityl oxide, 15% copolymer of vinyl chloride (75%) and methyl acrylate (25%), and 5% China-wood oil modified glycerol maleic anhydride resin polymerized to the degree specified. The dispersion is applied to an iron surface, dried, and baked at a temperature of 325° F. for 15 minutes. It will be found that stratification has occurred; that the alkyd resin is concentrated immediately upon the metal surface, and that a layer of the co-polymer overlies it. The coating will be found to be superior in adhesion, moisture and corrosion resistance, and in mar-resistance.

*Example 3*

To 100 grams of a polymer of methyl acrylate dissolved in 100 grams of methyl iso-butyl ketone, and 300 grams of toluol are added 100 grams of a solution containing 20 grams of castor oil modified, glycerine succinic anhydride alkyd resin, responsive to the limitations defined above, dissolved in 20 grams of methyl iso-butyl ketone and 60 grams of toluol. The resulting solution may be applied to a surface of tin-plate, for example, and baked for 15 minutes at a temperature of 325° F. The stratification described will have occurred and the product will be found to be superior both in adhesion and in inertness to atmospheric degradation, moisture, and other corrosive influences.

We claim as our invention:

1. The method herein described of producing upon the surface of a metal article a baked-on coating of maleic alkyd modified vinyl resin, which consists in bringing into metastable solution in a volatile solvent (1) a polymerized product of a material having the formula $CH_2=CHX$, in which X is a substance selected from a group that consists of the halogens; the hydroxyl radical; the monocarboxylic acyloxyl radicals; the methyl, ethyl, propyl, butyl, and higher homologous alkyl carboxylate radicals; and the phenyl radical; and (2) an incompletely polymerized drying-oil modified polyhydric alcohol maleic anhydride resin combined in the ratio of 70% oil to 30% resin, and having an acid number of 10–60, the molar ratio of polyhydric alcohol to maleic anhydride being the inverse of that between the reactive functional groups per molecule in the two substances, spreading upon the surface to be coated a film of such solution, and allowing evaporation to ensue, attended by segregation of the dissolved substances and concentration at the metal interface of the second-named substance, with displacement of the first-named substance toward the air interface, and baking the coated article at a temperature of 350°–400° F., with attendant continued polymerization of the second-named substance, segregated at the metal interface, whereby the second-named substance segregated at the metal interface, undergoing further polymerization, effects bond of the coating to the metal, and the first-named substance, segregated to the air interface, unimpaired by heat, affords protection from external injury.

2. The method herein described of producing upon the surface of a metal article a baked-on coating of an alkyd-modified vinyl resin, which consists in bringing into metastable solution in volatile liquid (1) a copolymer of vinyl chloride and ethyl acrylate and (2) an incompletely polymerized drying-oil modified polyhydric alcohol maleic anhydride resin combined in the ratio of 70% oil to 30% of resin, and having an acid number of 35–40, the molar ratio of polyhydric alcohol to maleic anhydride being the inverse of that between the reactive functional groups in the two substances, spreading upon the surface to be coated a film of such solution, and allowing evaporation to ensue, attended by segregation of the dissolved substances and concentration at the metal interface of the incompletely polymerized drying-oil modified maleic anhydride polyhydric alcohol resin, with displacement of the copolymer toward the air interface, and baking the coated article at a temperature of 350°–400° F. with continued polymerization of the second-named substance, concentrated at the metal interface, whereby the second-named substance segregated at the metal interface, undergoing further polymerization, effects bond of the coating to the metal, and the first-named substance, segregated to the air interface, unimpaired by heat, affords protection from external injury.

3. The method herein described of producing upon the surface of a metal article a baked-on coating of alkyd-modified vinyl resin, which consists in bringing into metastable solution in volatile liquid (1) a polymerized product of a material having the formula $CH_2=CHX$, in which X is a substance selected from a group that consists of the halogens; the hydroxyl radical; the monocarboxylic acyloxyl radicals; the methyl, ethyl, propyl, butyl, and higher homologous alkyl carboxylate radicals; and the phenyl radical; and (2) an incompletely polymerized vegetable-oil modified glycerol maleic anhydride resin in which the percentage of oil by weight lies between 30 and 70 and the acid number between 10 and 60, the molar ratio of glycerol to maleic anhydride being 2:3, spreading upon the metal surface to be coated a film of such solution, and allowing evaporation to ensue, attended by segregation of the dissolved substances and concentration at the metal interface of the second-named substance with displacement of the first-named substance toward the air interface, and baking the so coated body at a temperature of 350°–400° F. with continued polymerization of the second-named substance, displaced to the metal interface, whereby the second-named substance segregated at the metal interface, undergoing further polymerization, effects bond of the coating to the metal, and the first-named substance, segregated to the air interface, unimpaired by heat, affords protection from external injury.

4. The method herein described of coating a metal surfaced body with a resinous coating, which consists in bringing into meta-stable solution in volatile liquid a co-polymer of vinyl chloride (87%) and vinyl acetate (13%) and a drying oil modified maleic glyceride containing 70% drying oil and 30% intermediate reaction product between maleic anhydride and glycerine combined in the molar ratio of 3:2 and having an acid number of 35-40, spreading upon the surface to be coated a film of such solution, and allowing evaporation to ensue, attended by segregation of the dissolved substances and concentration at the metal interface of the oil-modified maleic glyceride with displacement of the co-polymer toward the air interface, and baking the coated body at a temperature of 350°–400° F., whereby a coating is attained that is unimpaired by the baking that affords superior adhesion to the metal combined with inertness to injury from without.

5. The method herein described of covering a metal surface with a resinous coating, which consists in bringing into meta-stable solution in volatile liquid (1) a co-polymer of vinyl chloride (80%) and ethyl acrylate (20%) and (2) an incompletely polymerized oil-modified polyhydric alcohol maleic anhydride resin having an acid number of 35-40, spreading upon the surface to be covered a film of such solution, and allowing evaporation to ensue, attended by segregation of the dissolved substances and concentration at the metal interface of the incompletely polymerized oil-modified polyhydric alcohol maleic anhydride resin, with displacement of the co-polymer to the air interface, and baking the coated body, whereby a covering is attained that is integral and that possesses superior adhesion to the metal combined with inertness to injury from without.

WILBUR W. CASTOR.
FRANK R. STONER, Jr.